W. HORROCKS, DEC'D.
F. L. YONKER & W. O. PRESCOTT, EXECUTORS.
REGULATOR FOR WATER HEATERS.
APPLICATION FILED MAR. 20, 1912.
1,115,466. Patented Oct. 27, 1914.
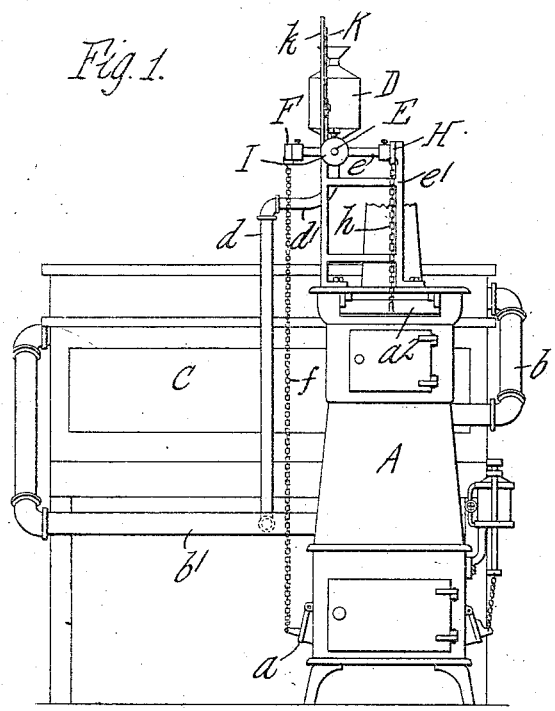
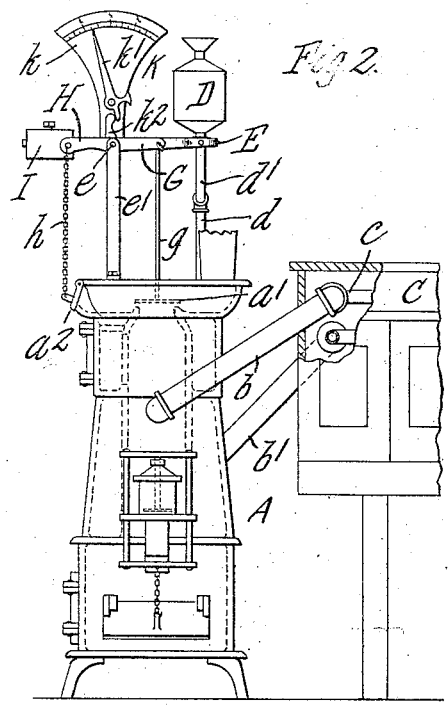
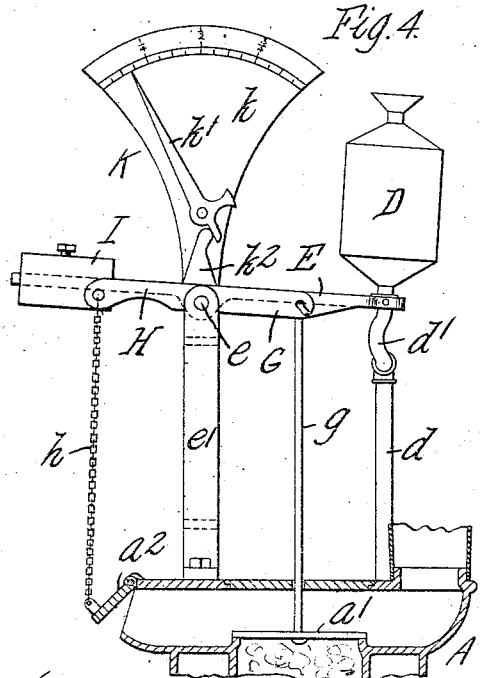
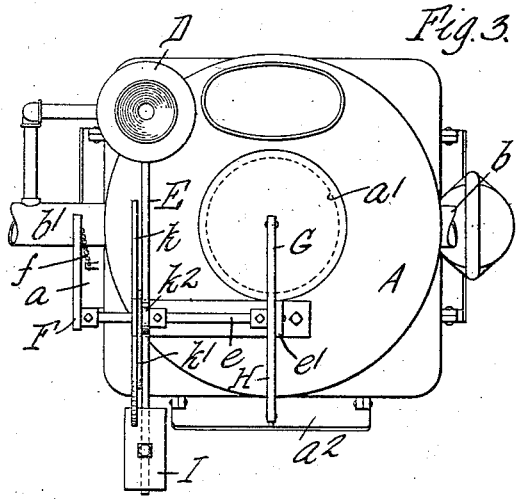

UNITED STATES PATENT OFFICE.

WILLIAM HORROCKS, OF HERKIMER, NEW YORK; FRANCHER L. YONKER, OF DOLGE-VILLE, NEW YORK, AND WILLIAM C. PRESCOTT, OF HERKIMER, NEW YORK, EXECUTORS OF SAID HORROCKS, DECEASED.

REGULATOR FOR WATER-HEATERS.

1,115,466.  Specification of Letters Patent. Patented Oct. 27, 1914.

Application filed March 20, 1912. Serial No. 685,032.

*To all whom it may concern:*

Be it known that I, WILLIAM HORROCKS, a citizen of the United States, residing at Herkimer, in the county of Herkimer and State of New York, have invented a new and useful Improvement in Regulators for Water-Heaters, of which the following is a specification.

This invention relates to regulators for water heaters and is primarily intended for use in connection with the water heaters of incubators, for automatically regulating the temperature of the incubator. The invention is, however, also applicable to water heaters for other purposes.

The object of the invention is to produce a practical and efficient automatic regulator, which, while being of simple and inexpensive construction, will, nevertheless, be very sensitive in action and operate so as to maintain a practically invariable temperature of the water. This is accomplished by mounting on a pivoted balance beam or lever, a tank or receptacle which is connected to the water circulating system so that the expansion or contraction of the water, due to fluctuations in the temperature thereof, will cause an increase or decrease in the amount and weight of the water in the expansion tank and thus move the balance beam which is connected to the regulating dampers of the water heater. It has been attempted heretofore to operate the regulating dampers of a water heater by a float actuated by the expansion and contraction of the water in a receptacle connected with the water circulating system. In such an arrangement, however, the change in the temperature of the water necessary to produce a substantial movement of the float and regulating action of the dampers is so great as to preclude a very close regulation of the temperature. By the use of the balance beam or lever actuated by variations in the weight of the water therein, as above explained, a very slight change in the amount of water in the expansion tank will cause a positive and substantial movement of the lever and thus insure a certain and accurate regulation.

In the accompanying drawing: Figure 1 is a front elevation of an incubator and water heater therefor embodying the invention. Fig. 2 is a fragmentary side elevation thereof. Fig. 3 is a plan view of the heater, on an enlarged scale. Fig. 4 is a fragmentary side elevation thereof, partly in section, on an enlarged scale, showing a different position of the regulating mechanism.

Like reference characters refer to like parts in the several figures.

A represents a water heater of ordinary construction having a draft damper $a$, a damper $a'$ which controls communication between the fire pot and the smoke pipe, and a check damper $a^2$ for admitting air to the smoke pipe.

$b$ and $b'$ represent respectively the outgoing and return pipes of the water circulating system, which, in the apparatus shown in the drawings, includes a heating coil $c$ in an incubator C.

D represents a tank or receptacle which is movably supported on a pivoted balance beam or lever E and is connected by a pipe $d$ with some part of the water circulating system of the heater, for instance, to the return pipe $b'$ thereof, so that the expansion and contraction of the water in the system, due to changes in its temperature, will cause the water to rise or fall more or less in the expansion tank D and therefore increase or decrease the weight on the tank end of the beam or lever E accordingly. The pipe $d$ has a section $d'$ of flexible hose, or it is otherwise connected to the expansion tank D so as to permit the tank to move with the beam or lever E. The beam or lever is preferably secured to a shaft $e$ which is mounted to rock in a bearing frame $e'$ of any suitable construction on the heater A and is provided with rigidly secured arms F G and H. The arms F and G extend in the same direction from the shaft, preferably at its opposite ends, and the former is connected by a chain $f$ or the like to the draft damper $a$, while the latter is connected by a rod $g$ or other connection to the smoke pipe damper $a'$. The third arm H is preferably integral with the arm G and extends in the opposite direction from the rock shaft, being connected by a chain $h$ to the check damper $a^2$. A weight I is adjustably secured on the balance beam at the opposite side of the shaft from the expansion tank. By appropriately adjusting this weight the beam can be nicely balanced so that it will be caused to swing in one or the other direction by a slight increase or decrease in the weight of water in the expansion tank.

In the operation of the regulator, if the temperature of the water falls below a predetermined desired minimum, the consequent contraction of the water will lower the level thereof in the expansion tank and the tank end of the balance beam will rise, which will open the draft and smoke pipe dampers $a$ and $a'$ and close the check damper $a^2$. This will cause a hotter fire in the heater and a rise in temperature of the water. The water will expand as its temperature rises, and raise the water level in the expansion tank which will cause the tank end of the lever to descend, thereby closing the draft and smoke pipe dampers $a$ and $a'$ and opening the check damper $a^2$, which again reduces the temperature of the water. The beam will thus oscillate and actuate the dampers in response to fluctuations in the temperature of the water so as to maintain a practically constant predetermined temperature of the water. As the mechanism described is susceptible of being nicely balanced, it will be evident that it can be caused to operate upon a very slight change in the weight of the water in the expansion tank. The regulator is therefore very sensitive in action, and a small change in the weight of the water in the expansion tank will produce a substantial movement of the balance beam and the dampers of the heater.

K represents an indicator for showing the position of the dampers. This indicator in the construction shown comprises a dial $k$ which is fixed to the bearing frame $e'$ adjacent to the balance beam, and a pointer $k'$ which is pivoted on the dial and is moved by an arm or projection $k^2$ on the balance beam. The position of the dampers can be ascertained at a glance by observing the position of the pointer on the dial. This indicator is desirable but is not essential to the operation of the regulator and can be omitted if preferred.

I claim as my invention:

1. The combination with a water heater having a water circulating system, a draft damper, a check damper, and a damper controlling the smoke passage of said heater, of a beam, a rock shaft to which said beam is fixed, an expansion tank movably supported by said beam and connected with said circulating system, two arms extending from said rock shaft in one direction and connected respectively to said draft and smoke passage dampers, and a third arm extending from said shaft in the opposite direction and connected to said check damper, substantially as set forth.

2. The combination with a water heater having a water circulating system and a central smoke passage, a draft damper, a check damper, and a lid for closing the top of said smoke passage, of a frame mounted on top of said heater, a rock shaft journaled in said frame, a beam fixed to said rock shaft having a counterweight on one end thereof and an expansion tank on the other end thereof, said expansion tank being connected with said circulating system, an arm fixed to one end of said rock shaft and connected with one of said dampers, a lever fixed to the other end of said rock shaft, the arms of said lever projecting on opposite sides of said rock shaft, the outwardly projecting arm of said lever being connected to the second of said dampers and the inwardly projecting arm of said lever being connected to the lid for said smoke passage.

3. The combination with a water heater having a water circulating system, a central vertical smoke passage, a pivoted draft damper adapted to close by gravity located at one side of the body of the heater, a pivoted check damper adapted to close by gravity located at one side of the body of the heater and disposed at an angle to the draft damper, and a lid for closing the upper end of said smoke passage, of a frame mounted upon and projecting upwardly from the top of said heater, a rock shaft journaled in said frame, a beam fixed to said rock shaft, a counterweight on one end of said beam, an expansion tank on the other end of said beam, connections including a flexible pipe between said circulating system and said expansion tank, a lever fixed to said rock shaft and having an arm projecting over the lid for closing said smoke passage, a connection between said arm and said lid, said lever having a second arm projecting beyond the edge of the top of the heater, a connection from said arm to one of said dampers, an end of said rock shaft projecting over the side of said heater to which the second of said dampers is pivoted, an arm secured to said projecting end of the rock shaft, and a connection from said arm to the second of said dampers.

Witness my hand, this 14th day of March, 1912.

WILLIAM HORROCKS.

Witnesses:
Wm. C. Prescott,
Essie R. Henderson.